United States Patent Office 3,405,168
Patented Oct. 8, 1968

3,405,168
N-SUBSTITUTED MONOAMIDOTRIPHOSPHATE AND PROCESSES FOR THEIR MANUFACTURE
Xavier Kowalski and Kenneth J. Shaver, St. Louis, Mo., assignors to Monsanto Company, St. Louis, Mo., a corporation of Delaware
No Drawing. Filed Dec. 2, 1964, Ser. No. 415,499
24 Claims. (Cl. 260—501.12)

The present invention relates to the production of detergent compositions. More particularly, the present invention relates to novel combination sequestrant-surfactants and to processes for their manufacture and use.

Ordinarily manufacturers who make detergents for use in hard water formulate their products using several different types of materials for several definite desired results. For example, although materials (such as fabric brighteners, antiredeposition agents, fabric softeners, fillers, water, sequestrants and surface active agents) that are used in the formulation of so-called "built" detergents are usually blended together, by the manufacturer starting with his stocks of the individual materials. The particular reasons for using each of the aforementioned types of materials in any given detergent formulation are well known by those in the art and need not be detailed here. There has been a strong desire for many years, however, by those in the detergent art, for a class of chemical compounds having the ability to both sequester water "hardness" ions (such as $Ca^{++}$, $Mg^{++}$, $Fe^{++}$, and the like) and serve as a surface active agent having detergent, foaming, and/or dispersant properties such as those of conventional synthetic organic detergents (surfactants).

Consequently, it is a primary object of the present invention to provide processes for the manufacture of valuable chemical compounds having combined sequestrant-surfactant properties.

It is another primary object of this invention to provide novel and valuable chemical compounds having such combined (sequestrant and surfactant) properties.

It is still another object of the present invention to provide a novel sub-class of compounds having combined sequestrant-surfactant properties, which compounds (in addition to being excellent sequestrants) are particularly useful as detergents and foaming agents.

It is yet another object of the present invention to provide a novel sub-class of compounds having combined sequestrant-surfactant properties, which compounds (in addition to being excellent sequestrants) are particularly useful as dispersants.

These objects, as well as others which will be apparent from the following specification and claims are obtained by reacting together a primary organic amine having from 1 to about 30 carbon atoms per primary amine radical with an alkali metal trimetaphosphate.

Thus, the processes of the present invention are illustrated by the following reaction:

(A) 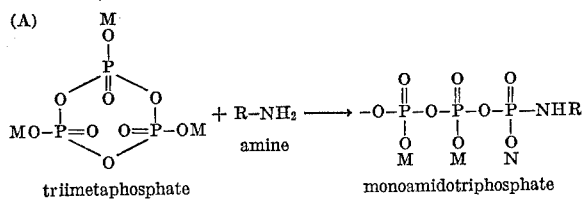
trimetaphosphate        monoamidotriphosphate wherein M is either an alkali metal cation, $NH_4$, or H, and at most 2 of M in the trimetaphosphate reactant are H, and R is an aliphatic radical containing from 1 to about 30 carbon atoms. These processes are preferably carried out in water or in an aqueous medium in which the alkali metal trimetaphosphate is soluble to the extent of at least about 0.1 weight percent.

The valuable combination sequestrant-surfactant compounds of the present invention are water-soluble or water-dispersible N-substituted monoamidotriphosphates having the structure (I) 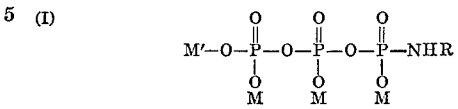

wherein R is a hydrophobic aliphatic radical containing from 1 to about 30 carbon atoms, M is selected from the group consisting of alkali metal cations and ammonium ions, and M' is selected from the group consisting of $R-NH_3^+$ cations, ammonium cations, $H^+$, and metallic cations. Generally, those N-substituted monoamidotriphosphates containing from about 12 to about 30 carbon atoms in the R group are useful as fabric softeners; those that contain from about 6 to 11 carbon atoms in their R groups are more useful as detergent active materials, foaming agents, or wetting agents; while those that have R groups containing fewer than an average of 6 carbon atoms are useful dispersants (as well as being valuable sequestrants).

Thus, a preferred sub-class of the N-substituted monoamidotriphosphates of the present invention has particularly valuable utility as dispersants for such materials as, for example, clays in aqueous media and encompasses those materials that are soluble in water to the extent of at least about 0.1 weight percent and have the sructure of Formula I, above; except that R is a hydrophobic aliphatic radical containing from 1 to about 5 carbon atoms.

Typical examples of these compounds (which have such unexpected combined dispersant-sequestrant properties) include products resulting from reacting together [via a reaction such as that of reaction (A), above] one or more inorganic trimetaphosphates with one or more primary aliphatic amines containing from 1 to about 5 carbon atoms. Useful trimetaphosphates include, for example (where "$P_3O_9$" represents the trimetaphosphate anion) the alkali metal trimetaphosphates such as $Na_3P_3O_9$, $K_3P_3O_9$, $Li_3P_3O_9$, $Rb_3P_3O_9$, $Cs_3P_3O_9$, $Fr_3P_3O_9$, $Na_2KP_3O_9$
$NaKHP_3O_9$, $NaLiHP_3O_9$ $NaCsP_3O_9$, $Na_2LiP_3O_9$
$Na_2CsP_3O_9$, $Na_2HP_3O_9$, $Na_2RbP_3O_9$, $K_2NaP_3O_9$
$K_2LiP_3O_9$, $HLiHP_3O_9$, $K_2HP_3O_9$, $K_2RbP_3O_9$, $K_2CsP_3O_9$
$KCsHP_3O_9$, $KRbHP_3O_9$, $LiRbHP_3O_9$, $LiCsHP_3O_9$
$LiFrHP_3O_9$, $Li_2NaP_3O_9$, $Li_2KP_3O_9$, $Li_2HP_3O_9$, $Li_2RbP_3O_9$
$Li_2CsP_3O_9$, $Rb_2NaP_3O_9$, $Rb_2KP_3O_9$, $Rb_2LiP_3O_9$, $Rb_2HP_3O_9$
$Rb_2CsP_3O_9$, $RbCsHP_3O_9$, $Cs_2NaP_3O_9$, $Cs_2KP_3O_9$
$Cs_2HP_3O_9$, $Cs_2LiP_3O_9$, $NaH_2P_3O_9$, $KH_2P_3O_9$, $LiH_2P_3O_9$
$RbH_2P_3O_9$ $CsH_2P_3O_9$, $FrH_2P_3O_9$; the ammonium trimetaphosphates $[(NH_4)_2HP_3O_9$, $(NH_4)_3P_3O_9$ and $(NH_4)H_2P_3O_9]$; the mixed ammonium-alkali metal cation trimetaphosphates such as $(NH_4)_2NaP_3O_9$, $(NH_4)_2KP_3O_9$, $(NH_4)_2LiP_3O_9$, $(NH_4)_2RbP_3O_9$, $(NH_4)_2CsP_3O_9$, $(NH_4)_2FrP_3O_9$
$Na_2NH_4P_3O_9$, $K_2NH_4P_3O_9$, $Li_2NH_4P_3O_9$, $Rb_2NH_4P_3O_9$, $Cs_2H_4P_3O_9$, $NaKNH_4P_3O_9$, $NaLiNH_4P_3O_9$
$NaRbNH_4P_3O_9$, $NaCsNH_4P_3O_9$, $KLiNH_4P_3O_9$
$KCsNH_4P_3O_9$, $KRbNH_4P_3O_9$, $LiRbNH_4P_3O_9$,
$LiCsNH_4P_3O_9$, $LiFrNH_4P_3O_9$, $RbCsNH_4P_3O_9$
$RbFrNH_4P_3O_9$ and $CsFrNH_4P_3O_9$.

Typical examples of the primary aliphatic amines having from 1 to about 5 carbon atoms include methylamine, ethylamine, isopropylamine, tert-butylamine, n-propylamine, allylamine, 2-aminobutane, isobutylamine, n-butylamine, 2-amino-2-methylbutane, 5-amino-1-pentene, 2-amino-n-pentane, isoamylamine, 2-methyl-n-butylamine, n-amylamine, ethylenediamine, 5-amino-3-nitro-1-pentene, tetramethylenediamine, 2-hydroxy-n-propylamine, 2-hydroxyethylamine, 3-amino-n-pentanol-2, 2-aminopropyl alcohol, 1,2,3-triaminopropane, 4-amino-n-pentyne-2, 2,3-dichloropropylamine, 2,2,2,-tribromoethylamine, 3-nitrilo-1-propylamine, methyl-3-aminopropyl ether, ethyl-2-amino-propyl thioether, and the like.

Another preferred sub-class of the valuable N-substituted monoamidotriphosphates of the present invention has particularly valuable utility as general purpose detergents and foaming agents. This sub-class encompasses those materials that are either soluble in water or readily dispersible in water and have the structure illustrated by Formula I, above; except that R (in this particularly preferred sub-class) is a hydrophobic radical containing from about 6 to 11 carbon atoms. Typical examples of these compounds (having combined detergent and foaming sequestrant properties) include products having the structure illustrated by Formula I, above, resulting from reacting together [via a reaction like reaction (A), above] one or more of the aforementioned useful trimetaphosphates with an aliphatic primary amine containing from about 6 to about 11 carbon atoms such as, for example, n-hexylamine, 3-amino-n-hexane, 1,3-propanediamine, 4-amino-n-heptane, 2-amino-n-heptane, diethylethylenediamine, n-heptylamine, trichloro-n-octylamine, n-octylamine, 2-ethyl-4-methyl 1-heptylamine, 4-fluoro-n-decylamine, 3-amino-hexylalcohol, n-nonylamine, 6-nitro-1-heptylamine, methyl-6-amino-heptyl ketone, 2-chloropropyl-3-aminopropyl ether, 7-amino-n-heptaldehyde and the like.

Another preferred sub-class of the valueable N-substituted monoamidotriphosphates of the present invention has particularly valuable utility as fabric softeners in addition to being valuable sequestrates. This sub-class encompases those materials that are either soluble in water or readily dispersible in water and have the structure illustrated by Formula I, above; except that R (in this particularly preferred sub-class) is a hydrophobic radical containing from about 12 to about 30, and preferably from about 14 to about 22 carbon atoms. Typical examples of these compounds (having combined fabric softener-sequestrant properties) include products having the structure illustrated by Formula I, above, resulting from reacting together [via a reaction like recation (A), above] one or more of the aforementioned useful trimetaphosphates with an aliphatic primary amine containing from about 12 to about 30 carbon atoms such as, for example, primary tallow amine, n-octadecylamine, oleyl amine, primary coconut oil amine, primary hydrogenated tallow amine, n-lauryl amine, stearyl amine, palmityl amine, myristyl amine, linoleyl amine, arachidyl amine, behenyl amine, cerotyl amine, 9,10-dodecenyl amine, ricinoleyl amine, linolenyl amine, gadoleyl amine, and the like, as well as all of these (and others) having substituents on their otherwise hydrocarbyl chains that ordinarily do not react with the alkali metal trimetaphosphates.

The generic processes of the present invention involve essentially the reaction of a primary aliphatic amine with a trimetaphosphate to thereby produce one of the valuable N-substituted monoaliphatic monoamidotriphosphates described above. The reaction is believed to proceed as illustrated in Equation A, above, when one mole of amine is reacted with one mole of trimetaphosphate. When "excess" amine (i.e., more than about 1 mole of amine per mol of reaction product) is present in the reaction mixture, the corresponding amine salt is believed to be formed:

Trimetaphosphate+2H₂N—R ⟶

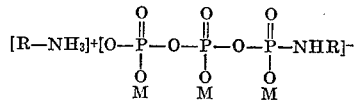

While the trimetaphosphate and the amine can be present in the reaction mixtures of the present invention in practically any relative proportions, in situations in which the desired combination sequestrant-surfactant is intended to be subsequently isolated and/or concentrated or recovered as such from the reaction mixture, generally the molar ratio of primary amine to trimetaphosphate used in the present processes should be from about 0.2:1 and about 5:1, while if optimum results are desired, stoichiometric proportions theroef should be utilized.

The reaction of trimetaphosphate with primary amine is preferably carried out in water (or in an aqueous system in which some trimetaphosphate can be dissolved) having a pH (when measured at about 25° C. at the one weight percent level of the reaction mixture in distilled water) between about 7 and about 10.5. Generally, competing reactions such as hydrolysis of the polyphosphate and/or formation of alkali metal chain phosphate salts also occur to a significant extent when aqueous reaction mixtures having pH's outside of this preferred pH range (for example at pH's below about 6 and above about 11) are utilized to produce the desired combination sequestrant-surfactants of the present invention. Preferably enough water should be used so that the reaction mixture is fairly fluid during the entire reaction. Thus, preferably from about 10 to about 98 weight percent, based on the total weight of the reaction mixture, of water should be utilized. When primary amines that are insoluble or only partially soluble in water are utilized in the processes of this invention, generally the application of fairly intensive agitation (i.e. stirring) applied to the reaction mixture will result in sufficient contact between the trimetaphosphate and the amine to enable the desired reaction to proceed at a sufficiently fast rate.

While the particular time and/or temperature employed in the processes of this invention (for reaction of the primary amine with the trimetaphosphate) is not critical, generally it is preferred that the temperature of the reaction mixtures be above room temperature and within the range of from about 25° C. to about 105° C. For optimum results it is still further preferred that the temperature of the reaction mixture be at least about 40° C., and up to about 90° C. (under ambient pressures) for at least about 2 minutes of the total period in which the amine is contacted with the trimetaphosphate. If higher pressures are utilized higher reaction temperatures can also be used. Also, generally higher reaction temperatures (within the ranges mentioned) are used when relatively higher molecular weight primary amines are utilized in these processes, since the amine should preferably be melted during at least part of the reaction period.

Materials other than the trimetaphosphate and the primary amine can also be present in these reaction mixtures without substantially detracting from all of the benefits that can be obtained by practicing the present invention. Trimetaphosphates that are useful in the overall practice of this invention include all of the alkali metal (sodium, lithium, potassium, rubidium, cesium) trimetaphosphates, ammonium trimetaphosphate and mixed acidic alkali metal or ammonium trimetaphosphates (such as disodium monohydrogen trimetaphosphate, monosodium dihydrogen trimetaphosphate, diammonium monohydrogen trimetaphosphate, monoammonium dihydrogen trimetaphosphate, and the corresponding other mixed acidic alkali metal trimetaphosphate salts as well as those trimetaphosphates in which more than one alkali metal cation occurs).

While any aliphatic primary amine having the structure of Formula 2, below, (2)          R—NH₂

(wherein R is a hydrophobic aliphatic radical containing from 1 to about 30 carbon atoms) can be utilized advantageously in the practice of the present invention, those having from 1 to about 20 carbon atoms are preferred. Still further preferred are the primary aliphatic hydrocarbyl amines, and primary aliphatic hydrocarbyl amines that contain a single hydroxyl group substituted at some point on their otherwise hydrocarbyl group. Within this group of "primary aliphatic hydrocarbyl" group of amines, primary alkyl amines are preferred. Typical examples of some of the primary amines that can be used in the practice of this invention include all of those detailed above, as well as many others.

In the following examples, which illustrate some of the preferred embodiments of the present invention, all parts are by weight unless otherwise stated.

EXAMPLE I

Into a conventional stainless steel mixing vessel fitted with a fairly efficient stirrer are charged 1430 parts of n-octylamine, 1700 parts of trisodium trimetaphosphate, and 15,000 parts of water. The resulting mixture is then heated, with stirring, to about 96° C. and held at this temperature for about 90 minutes. After about the first 20 minutes of this reaction period the mixture is observed becoming thicker. At the end of the 90 minute reaction period, the reaction mixture is viscous and turbid. Upon being cooled to about 30° C., the reaction mixture becomes a semi-solid gel. It can be utilized in this form directly if desired. For example, a 0.2 weight percent solution of this reaction product in water foams extensively and chelates the usual water "hardness" ions as readily as does tetrasodium pyrophosphate (on a molar basis). If desired, the reaction product can be air-dried, or dried in a forced draft oven, for example, at about 60° C. The resulting dried reaction product also mixes readily with water.

Any of the above-described valuable combination sequestrant-surfactant compounds of the present invention can be made via processes such as that illustrated in Example I, with consideration being taken only with respect to the particular molecular weight of the reactants. Thus, any of the above-described useful primary amines can replace the trisodium trimetaphosphate in Example I, and any of the above-described useful primary amines can replace the n-octylamine. Generally, for optimum yields of the desired reaction product, it is better to utilize either somewhat lower reaction temperatures than those of Example I, or somewhat higher pressures over the reaction mixture, when relatively lower molecular weight amines (lower than about hexylamine) are utilized. For example, when monoethanolamine is the amine used, a maximum reaction temperature of about 65° C. is preferred, while when ethylamine is used, a maximum reaction mixture temperature of only about 45° C. is preferred. Otherwise excessive volatilization of these amines occurs.

Note that in Example I, the molar ratio of amine to trimetaphosphate is 2:1. Other ratios can also be used in processes like Example I, as can widely differing amounts of water, without significantly detracting from the benefits that can be derived from using such processes.

EXAMPLE II

Into a reaction vessel such as that described in Example I, above, are charged 100,000 parts of water, 3560 parts of tripotassium trimetaphosphate, and 3810 parts of borax (sodium tetraborate decahydrate). While the temperature of the resulting solution is maintained at about 60° C. and is stirred continuously, a total of 730 parts of n-butylamine is added slowly thereto over a period of 30 minutes. Then the resulting reaction mixture (having a pH between 9 and 10 during this entire reaction period) is stirred for an additional 60 minutes at about 60° C. At the end of this time, the solution is hazy, but very fluid, practically all of the reaction product remaining dissolved in the water.

Analysis of the resulting solution by nuclear magnetic resonance techniques indicate that about half of the trimetaphosphate charged is unreacted. Thus the resulting product is believed to have the structure:

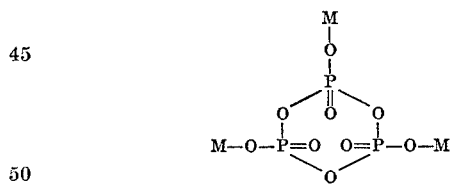

The product is as effective for softening hard water, on a molar basis, as tetrapotassium pyrophosphate. It is very soluble in water, and is therefore a valuable builder for use in liquid detergents, since it is also useful as a dispersant for soils, and as an antiredeposition agent.

The addition of other strong bases to reaction mixtures such as those of Example II can result in the replacement of the n-butylammonium $[C_4H_9NH_3]^+$ portion of the product by the cation of the particular base used. However, in aqueous solutions of the valuable combination sequestrant-surfactant compounds of this invention, the identification of the cation becomes unimportant, since the compound presumably ionizes to at least some extent whenever it dissolves in the water.

While even very small amounts of the compounds of the present invention are beneficial to at least some extent when they are dissolved and/or dispersed in water, it is generally preferred that at least about 0.05 weight percent (based on the weight of the resulting solution) of one or more of these combination surfactant-sequestrants be dissolved therein. For optimum results, when any of the combination detergent-sequestrants described hereinbefore, for example, is utilized, the aqueous solution should contain (dissolved therein) from about 0.02 to about 2 weight percent of the valuable combination detergent-sequestrant.

Other ways in which the compounds of the present invention can be used are as textile lubricants, flame-proofing agents in textiles and other organic materials such as wood; antistatic agents; as gasoline or other petroleum derivative additives, for example as anti-icers; as flotation agents in the recovery of various valuable ores; and the like.

What is claimed is:

1. A process for producing a N-mono-aliphatic mono-amido triphosphate which process comprises reacting together in an aqueous medium a trimetaphosphate having the structure

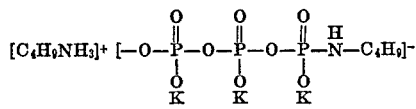

wherein M is selected from the group consisting of alkali metal cations, $NH_4$, and H, and at most 2 of M is H and a primary aliphatic amine containing from 1 to about 30 carbon atoms at a pH of from about 6 to about 11; the molar ratio of said aliphatic amine to said trimetaphosphate in said medium being from about 0.2:1 to about 5:1 and wherein said aqueous medium is at a temperature of from about 25° C. to about 105° C. and contains from about 10% to about 90% of water.

2. A process according to claim 1 wherein said trimetaphosphate and said amine are contacted for at least about two minutes.

3. A process according to claim 2, wherein said primary aliphatic amine is selected from the group consisting of primary monohydroxy-substituted hydrocarbyl and primary hydrocarbyl amines.

4. A process according to claim 3, wherein said alkali metal trimetaphosphate is sodium trimetaphosphate.

5. A process which comprises the steps of preparing a mixture by:
(a) intermixing sodium trimetaphosphate with (1) a primary aliphatic amine selected from the group consisting of monohydroxy-substituted hydrocarbyl amines and hydrocarbyl amines containing from 1 to about 20 carbon atoms and (2) from about 10 to about 98 weight percent, based on the weight of said mixture, of water; the pH of said mixture being between about 7 and about 10.5; and (b) subjecting said mixture to a temperature of from about 40 to about 90° C. for at least about 2 minutes to thereby react at least part of said amine with at least part of said sodium trimetaphosphate, whereby there is produced an N-substituted monoamidotriphosphate having the structure:

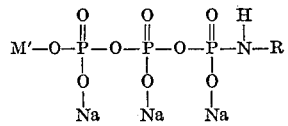

wherein R is an aliphatic radical selected from the group consisting of monohydroxy-substituted aliphatic hydrocarbyl radicals and aliphatic hydrocarbyl radicals containing from 1 to about 20 carbon atoms and M' is a cation.

6. A process as in claim 5, wherein said primary aliphatic amine is monoethanolamine.

7. A process as in claim 5, wherein said primary aliphatic amine is mono-octylamine.

8. A process as in claim 5, wherein said primary amine is octadecylamine.

9. A process as in claim 5, wherein said primary amine is dodecylamine.

10. A process as in claim 5, wherein said primary amine is n-butylamine.

11. An N-substituted monoamidotriphosphate having the structure

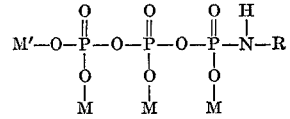

wherein R is a hydrophobic aliphatic radical containing from about 1 to about 30 carbon atoms, M is an alkali metal cation, and M' is a cation selected from the group consisting of M, $H^+$, $NH_4^+$ and $RNH_3^+$.

12. An N-substituted monoamidotriphosphate as in claim 11 wherein R contains from about 12 to about 30 carbon atoms.

13. An N-substituted monoamidotriphosphate as in claim 11 wherein R contains from about 6 to about 11 carbon atoms.

14. An N-substituted monoamidotriphosphate as in claim 11 wherein R contains from about 1 to about 5 carbon atoms.

15. An N-substituted monoamidotriphosphate as in claim 11, wherein said alkali metal cation is sodium.

16. Trisodium N - monododecyl monoamidotriphosphate.

17. Tripotassium N - monotetradecyl monoamidotriphosphate.

18. Trisodium N-hexadecyl monoamidotriphosphate.

19. Trisodium N-octadecyl monoamidotriphosphate.

20. Trisodium N-butyl monoamidotriphosphate.

21. Trisodium monoethanolammonium N-ethanol monoamidotriphosphate.

22. Trisodium mono-octylammonium N-mono-octylamino monoamidotriphosphate.

23. Tripotassium mono-octylammonium N-mono-octylamino monoamidotriphosphate.

24. Trisodium mono(-3-hydroxypropyl) ammonium N-mono (3-hydroxypropyl) amino monoamidotriphosphate.

References Cited

UNITED STATES PATENTS

| | | | |
|---|---|---|---|
| 2,304,157 | 12/1942 | Englemann | 260—500 |
| 2,382,178 | 8/1945 | Schilling et al. | 260—551 |
| 2,406,423 | 8/1946 | Woodstock | 260—984 |
| 2,727,928 | 12/1955 | Menn et al. | 260—501 |
| 2,731,420 | 1/1956 | Sylvester | 23—106 |
| 2,974,010 | 3/1961 | Koster | 23—106 |

FOREIGN PATENTS 1,111,187   7/1961   Germany.

LEON ZITVER, *Primary Examiner.*

J. E. EVANS, *Assistant Examiner.*

UNITED STATES PATENT OFFICE
CERTIFICATE OF CORRECTION

Patent No. 3,405,168            October 8, 1968

Xavier Kowalski et al.

It is certified that error appears in the above identified patent and that said Letters Patent are hereby corrected as shown below:

Column 1, after line 39 insert the following paragraph:

It is still another object of the present invention to provide a novel sub-class of compounds having combined sequestran surfactant properties, which compounds (in addition to being excellent sequestrants) are particularly useful as fabric softeners.

same column 1, lines 57 to 64, the formula should appear as shown below:

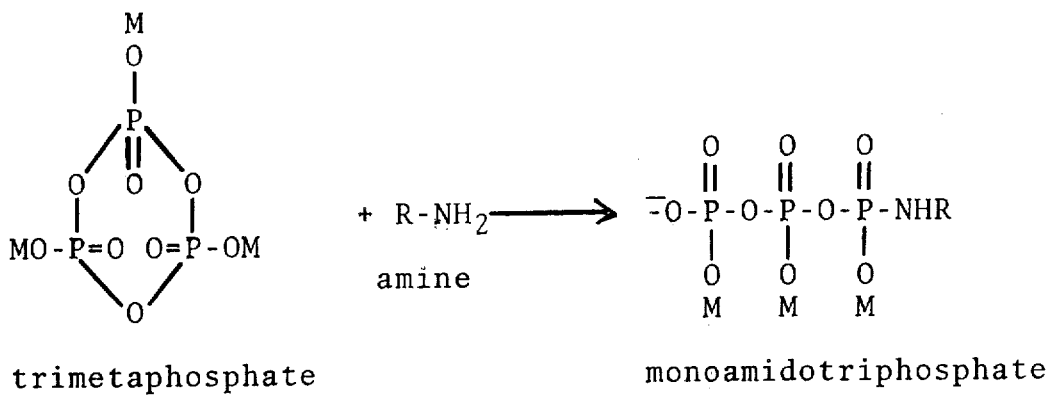

trimetaphosphate            monoamidotriphosphate

Column 6, line 23, "0.05" should read -- 0.005 --.

Signed and sealed this 10th day of March 1970.

(SEAL)
Attest:

EDWARD M. FLETCHER, JR.          WILLIAM E. SCHUYLER, JR.
Attesting Officer                Commissioner of Patents